United States Patent [19]

Rozenblatt

[11] Patent Number: 5,404,897
[45] Date of Patent: Apr. 11, 1995

[54] SYSTEM AND METHOD FOR PREVENTING LEAKAGE OF LIQUID WASTE FROM AN AIRCRAFT WASTE TANK DURING FLIGHT

[75] Inventor: Mike M. Rozenblatt, Manhattan Beach, Calif.

[73] Assignee: MAG Aerospace Industries, Inc., Compton, Calif.

[21] Appl. No.: 144,254

[22] Filed: Nov. 1, 1993

[51] Int. Cl.⁶ ............................................. F16K 37/00
[52] U.S. Cl. ........................................ 137/1; 137/554; 137/899.2; 251/144; 251/335.3
[58] Field of Search ................. 251/129.12, 335.3, 144; 137/554, 899.2, 1

[56] References Cited

U.S. PATENT DOCUMENTS

| Re. 32,750 | 9/1988 | Grills et al. ............................... 4/378 |
| Re. 33,782 | 12/1991 | Fujita et al. . |
| 1,325,310 | 12/1919 | Zaun . |
| 2,530,433 | 11/1950 | Jaegle .................................... 251/144 |
| 2,860,266 | 11/1958 | Schrader . |
| 2,953,154 | 9/1960 | Agoliati et al. . |
| 2,956,188 | 10/1960 | White . |
| 3,211,422 | 10/1965 | Brown .................................... 251/144 |
| 3,370,827 | 2/1968 | Stehlin .................................... 251/144 |
| 3,390,943 | 7/1968 | Myers .................................... 137/554 |
| 3,399,695 | 9/1968 | Stehlin ............................... 251/335.3 |
| 3,720,295 | 3/1973 | Bulz .................................. 251/129.12 |
| 3,908,959 | 9/1975 | Fichtner . |
| 4,069,952 | 1/1978 | Martin ..................................... 4/323 |
| 4,815,699 | 3/1989 | Mueller .............................. 251/335.3 |
| 4,877,059 | 10/1989 | Popescu et al. . |
| 4,882,792 | 11/1989 | Vincent . |
| 5,078,180 | 1/1992 | Collins . |

Primary Examiner—A. Michael Chambers
Attorney, Agent, or Firm—Pretty, Schroeder, Brueggemann & Clark

[57] ABSTRACT

An aircraft waste storage system and method intended to avoid leakage of liquid waste from an aircraft waste holding tank through the tank outlet tube during flight. The system uses a valve movable from a position at a predetermined depth within the outlet tube to form a liquid-tight circumferential seal with the outlet tube interior surface during flight to an open position during ground servicing in which the valve is withdrawn into the tank to allow the waste to discharge. The waste system uses an electric motor and drive screw to move the valve, which is controlled from the aircraft. It incorporates an alarm to provide a warning if the valve has failed to reach the predetermined depth within the outlet relied upon to prevent leakage.

9 Claims, 2 Drawing Sheets

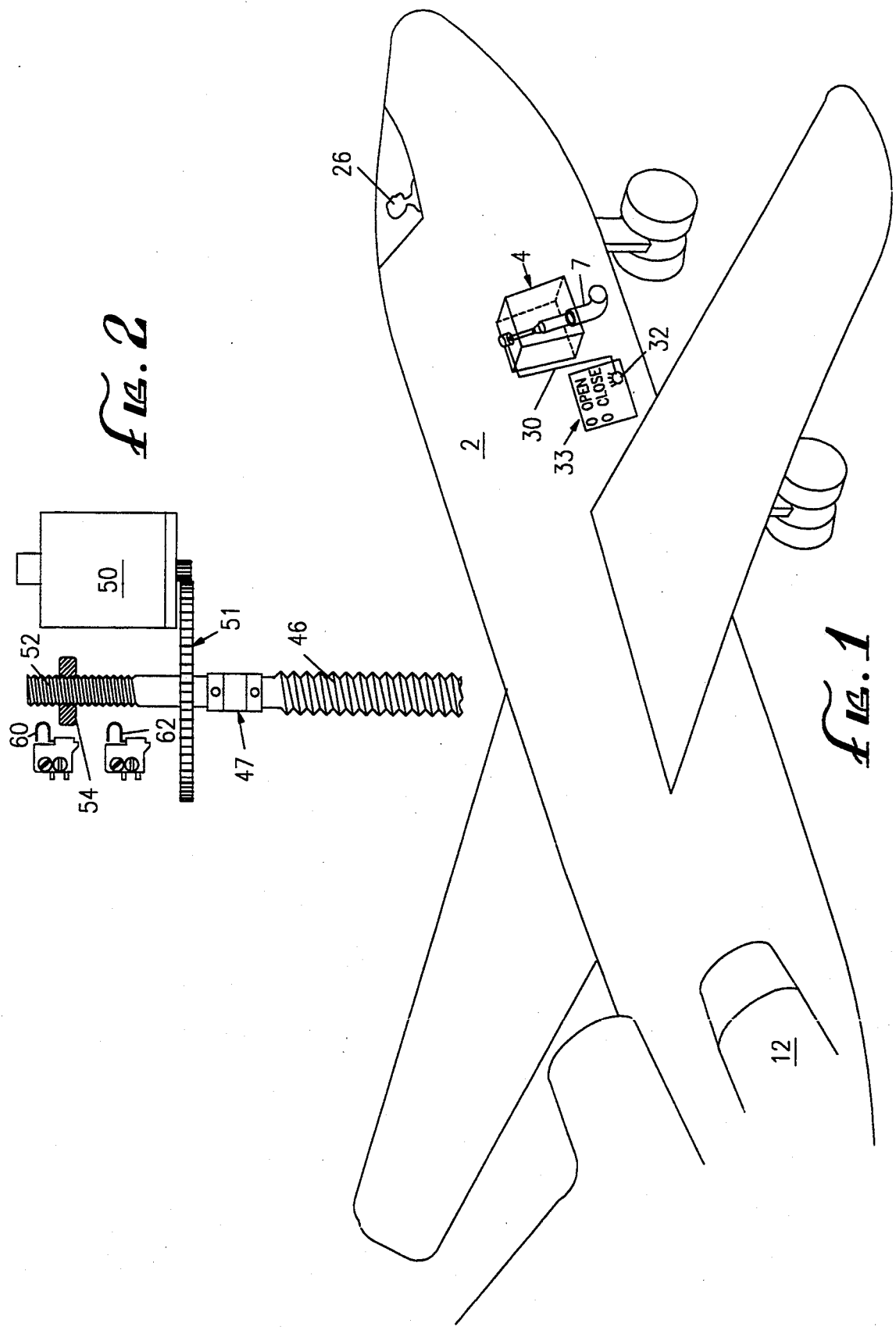

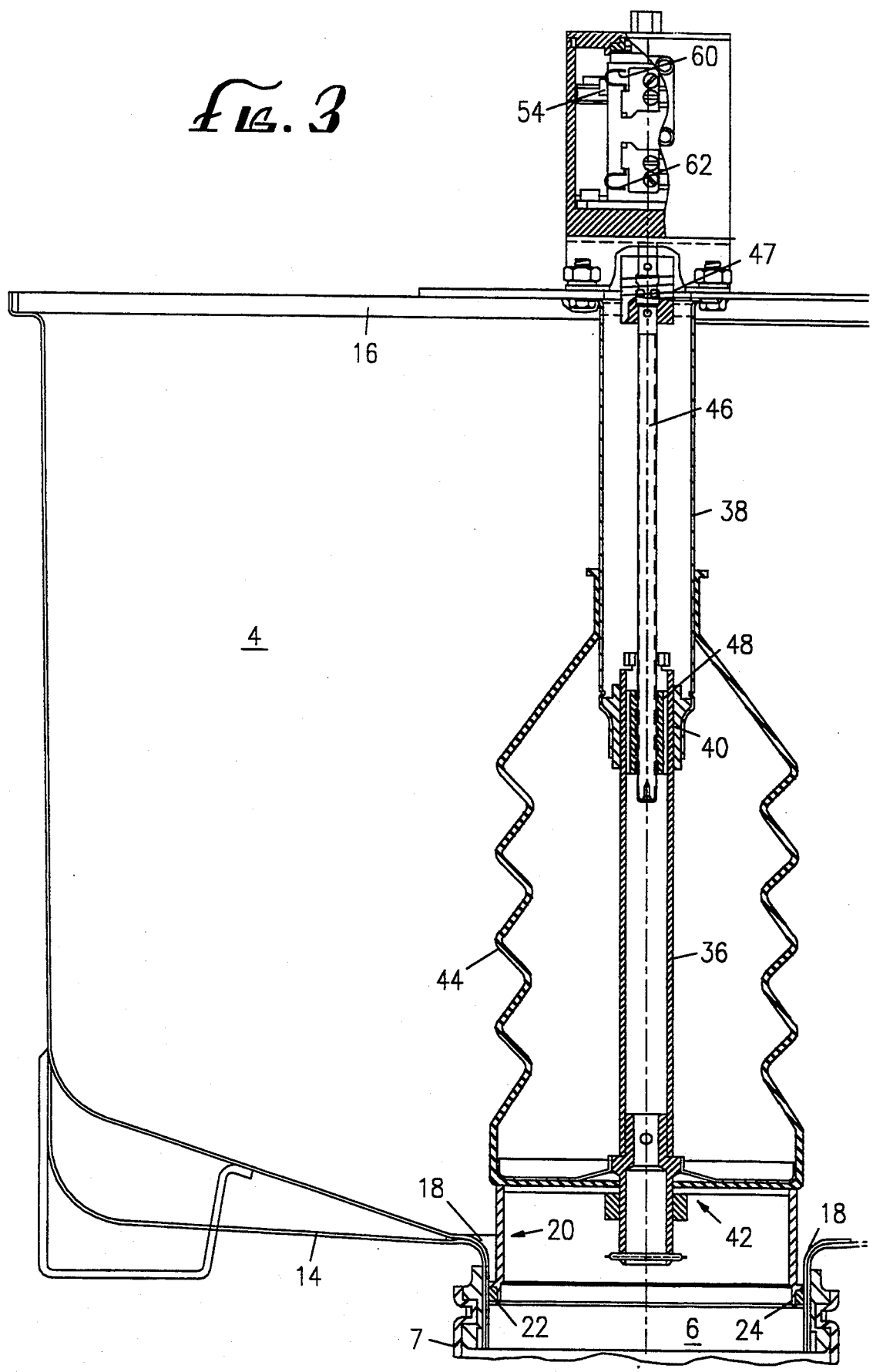

SYSTEM AND METHOD FOR PREVENTING LEAKAGE OF LIQUID WASTE FROM AN AIRCRAFT WASTE TANK DURING FLIGHT

FIELD OF THE INVENTION

This invention relates to an aircraft waste holding system for holding liquid wastes during flight and, in particular, to such a system in which a warning is provided if a waste discharge outlet has not been properly closed before flight commences.

BACKGROUND OF THE INVENTION

In the operation of commercial aircraft, it is necessary to provide on-board toilet facilities. These toilet facilities include at least one holding tank to store the liquid and solid waste resulting from toilet use by passengers together with the liquid used to provide flushing action. Although the waste includes both liquid and solid materials, the content of the holding tanks will be referred to hereinafter collectively as liquid waste. In some systems, called recirculating systems, a chemical disinfectant fluid is recirculated from the holding tank through the toilet in successive flushing cycles. The discussion which follows will primarily be concerned with liquid waste from recirculating toilet tank systems using chemical disinfectant liquids. However, in other, non-recirculating systems, fresh water may be used in single flush operations, and the wastes are collected in a holding tank.

When an aircraft lands, the liquid waste must be emptied from the holding tank. Typically, each holding tank has an outlet tube extending from an opening in the bottom surface of the tank downwardly and outwardly to an access port mounted in the skin of the fuselage. Flow of the liquid waste out of the tank into the outlet tube is controlled by a discharge valve operated by a valve actuator. The valve actuator moves the discharge valve between a seated position, closing passage through the outlet tube, and an unseated position in which fluid can flow through the outlet tube. A serious problem with such systems is the possibility of leakage of liquid waste past an inadequately sealing discharge valve into the outlet tube during flight. To minimize the risk associated with this occurrence, it is common to require a separate removable plug at the outer end of the outlet tube, which provides a secondary closure. An access flap hinged or removably connected to the aircraft skin at the access port provides a third level of closure. Even despite the second and third levels of closure, unfortunate occurrences still happen in which significant volumes of liquid waste escape outside of the aircraft during flight.

This phenomenon has been common enough to be known in the airline industry as the build-up of "blue ice," so called because of the blue color of chemical disinfectants commonly used in aircraft toilets. Because of the cold temperatures at altitude, liquid wastes escaping past the tank discharge valve can sometimes leak around the access door to the exterior freeze and build up accretions of frozen blue ice. Losses of this blue ice may occur as the aircraft descends to warmer altitudes for landing which causes partial thawing and detachment of the blue ice accretions. There are periodic reported instances of frozen toilet wastes landing in the backyards of homes near airports or crashing through their roofs. Such an incident is reported, for example, in the newspaper "USA Today" for Oct. 21, 1992 at page 3A under the headline "The sky's not falling, that's passenger poop." The dangerous and highly distasteful consequences of blue ice incidents are not confined to those on the ground. The detached blue ice can be deflected into the intakes of jet engines on the aircraft causing costly engine corrosion, game outs and even life-threatening situations.

Accordingly, it has been an important aim of the designers of aircraft waste holding systems to devise a tank discharge valve and actuator which will minimize the risk of waste leakage through the outlet tube during flight. One such prior system is disclosed, for example, in U.S. Pat. No. Re. 32,750 to Grills and Colditz for "Fluid Operated Waste Tank Servicing Assembly." Such a system uses a holding tank having an outlet tube in its lower wall with a chamfered shoulder at its opening to the tank. A cylindrical valve, of larger diameter than the outlet tube, has a chamfered resilient seal which engages the chamfered shoulder to seal against it. The valve is raised and lowered from its seated condition on the shoulder by an actuator shaft connected, by a piston and cylinder arrangement, to the upper wall of the holding tank.

While systems of this general type may be generally satisfactory for their intended purposes, leakage problems can arise in connection with a plunger which relies upon seating on top of a chamfered or rounded shoulder at the junction between the lower wall of the holding tank and the outlet tube. For example, aircraft passengers sometimes gush items such as Q-tips, tampons, hairpins, razor blades, bottle tops, etc. down the toilet. During the emptying of the tank at the end of the flight, these articles can become lodged on the shoulder of the outlet opening while the valve is raised and can then prevent it closing properly which creates a leakage condition for the next flight. Over an extended period of use, attempted closures of the valve on top of obstructing foreign objects can cause surface blemishes in the shoulder, such as scratches or indentations, which create seepage channels through which liquid waste can bypass the valve even when no obstruction is present.

An alternative approach is to utilize a valve which does not rely on a seal between an oversized valve and a shoulder or chamfer at the intersection between the bottom of the tank and the outlet tube but, instead, uses a valve which is inserted into the inside of the outlet tube and incorporates a sidewardly facing peripheral seal. Such a sealing arrangement is shown, for example, in U.S. Pat. No. 4,069,952 to Martin for "Containers For Noxious Substances." The Martin patent is concerned with a container for emptying the contents of chemical toilets but does not specifically address the aircraft environment. With such an arrangement, it is important to ensure that the side seal on the valve has penetrated sufficiently far down into the outlet tube to have moved past any surface blemishes in the shoulder or chamfer area and to have wiped away any obstructions adhered to the sidewalls of the outlet tube that could interfere with sealing performance. From the point of view of the pilot of an airliner, he could have no assurance that this condition had been achieved with a device such as that disclosed in the Martin patent since it was not addressed to the specific problems of aircraft waste systems. In particular, the Martin patent did not suggest a warning system for indication of an inadequate penetration of the discharge valve into the outlet tube to ensure satisfactory sealing between the valve seal and the sides of the outlet tube.

In sum, the continuance of blue ice incidents, as periodically reported in the press, shows that the problem of leakage past the tank discharge valve persists despite the devices of the prior art.

SUMMARY OF THE INVENTION

The present invention provides a system and method of preventing leakage of liquid waste from an aircraft waste tank during flight, which is intended to solve the problems which have been described.

The aircraft waste holding system of the present invention includes a holding tank for storing the liquid waste and an outlet tube connected to a lower wall of the tank. A valve is shaped to enter and fit sealingly within the outlet tube and is guided along a predetermined path from the interior of the tank into the interior of the outlet tube. A drive actuator drives the valve back and forth along the predetermined path. A monitor monitors the depth to which the valve has been inserted into the outlet tube and is connected with a warning device positioned at an appropriate location in the aircraft, typically an operator service panel used by the ground operators who empty the tank. The warning device operates in an alarm condition until the monitor detects that the valve has been inserted a predetermined depth into the outlet tube sufficient to ensure sealing against leakage of waste past the valve. The predetermined depth is sufficient to ensure that the side surfaces of the valve have moved past the open mouth of the outlet tube, which may suffer from blemishes around its shoulder or foreign object obstructions that could contribute to leakage. The movement into the tube wipes any objects lodged around the opening of the outlet tube down into the outlet tube so that the side surfaces of the valve can assure a complete circumferential seal with the interior surface of the discharge tube.

The present aircraft waste system provides a warning alarm that gives an alert prior to take off if the discharge valve has not achieved the predetermined depth of insertion required. Under such circumstances, appropriate servicing can be undertaken to correct the condition before flight commences, thereby avoiding leakage of waste past the valve during flight.

In more detail, the valve is guided by inner and outer telescoping tubes aligned with the outlet tube and connected to the upper wall of the tank and the valve, respectively. Telescoping movement of the inner shaft, to drive the valve, is effected by a threaded drive shaft concentrically positioned within the inner and outer tubes. The drive shaft is rotated by a reversible electric motor and carries a travelling nut fixed to the upper end of the inner tube thereby moving the valve in either direction depending on the direction of motor rotation. This structure enables the valve to be driven deep enough into a constant diameter region of the outlet tube to pass through a shoulder region of varying diameter where the outlet tube opens into the tank. In the shoulder region, the varying diameter and any surface blemishes caused by use could interfere with sealing efficiency. During motion through the shoulder region, any solid objects which may have become lodged on the lip of the opening are wiped down into the outlet tube ahead of the valve so that they cannot interfere with the effectiveness of the circumferential seal between the side surfaces of the valve and the interior surface of the outlet tube. To ensure that these results are achieved, movement is continued until a predetermined depth of entry of the valve into the outlet tube has been reached.

The function of monitoring the movement of the valve into the outlet tube is achieved by provision of a threaded monitoring shaft which is rotated by the electric motor concurrently with the drive shaft. An actuator threadedly engages the monitoring shaft for scaled movement along it proportionate to the movement of the valve effected by the drive shaft. A microswitch is mounted adjacent to the monitoring shaft at a fixed axial location corresponding to the position which the actuator occupies when the valve is at the predetermined depth in the outlet tube. The microswitch operates the warning device by an intervening electrical circuit. The circuit causes the alarm unit to be in its alarm condition until the valve has reached its predetermined distance of insertion in the outlet tube. When the predetermined distance is reached, the actuator on the monitoring shaft operates the microswitch to its other condition which switches the alarm unit to a non-alarm condition. This monitoring and warning arrangement provides assurance concerning the positioning of the valve within the outlet tube.

Because space and weight are at a premium in aircraft design, it is desirable to reduce the size of the monitoring shaft relative to the drive shaft. This desirable result is effected in the present invention by scaling the pitch of the threads on the drive shaft and on the monitoring shaft so that the monitoring shaft can be considerably shorter than the drive shaft and yet provide a range of movement of the actuator along it which is proportionate to the movement of the valve itself along its predetermined path. In the preferred embodiment, the monitoring shaft is mounted concentrically with the drive shaft but has a much finer pitch thread so that, in the same number of revolutions of both shafts, the actuator for the microswitch travels about a quarter of the length of the range of travel experienced by the valve itself.

These and other advantages and features of the invention will be described more fully in a detailed description which follows:

BRIEF DESCRIPTION OF THE DRAWINGS

An aircraft waste holding system, constructed according to the preferred embodiment of the invention, is illustrated in the accompanying drawings in which, FIG. 1 is a simplified view of a commercial airplane during ground servicing procedures, showing the placement of the waste holding tank and its outlet tube relative to the aircraft fuselage, wings and engine and, also, showing an electric circuit and warning alarm associated with the invention;

FIG. 2 is a simplified cross-sectional side view showing a monitoring shaft and drive shaft forming part of the waste holding system depicted in simplified form in FIG. 1; and FIG. 3 is a more detailed cross-sectional side view of the driving and guiding system for a discharge valve assembled with the drive shaft shown in FIG. 2.

DETAILED DESCRIPTION

An aircraft waste holding system (FIG. 1), constructed in accordance with the preferred embodiment of the invention, is incorporated in an exemplary commercial aircraft 2. The system includes at least one holding tank 4 which is shown, for exemplification, in the forward part of the aircraft fuselage for receiving and storing liquid wastes received from an associated toilet (not shown). The description which follows will primarily be with reference to a recirculating toilet system in which a disinfectant quid is recirculated through the toilet and its holding tank. However, the invention can also be used with non-recirculating aircraft waste systems, if desired. The toilet waste in the holding tank also includes liquid and solid wastes contributed by passengers through use of the toilets. The holding tank 4 has an outlet tube 6 (FIG. 3) at its lower end which feeds into a drain tube 7 leading to an access port in the side of the aircraft fuselage (FIG. 1). The lower end of the drain tube 7 is adapted to couple to the collecting hose of an airport sanitation truck. The access port is covered by a door (not shown) which may be moved aside to gain access to the lower end of the drain tube.

If the toilet wastes could leak down the outlet tube 6 and drain tube 7 during flight, there would be a risk that toilet waste could escape around the edge of the access door and built up around it into a frozen accretion of so-called "blue ice." Such an accretion, if it should become detached during flight, could be potentially harmful and very unpleasant to persons on the ground. Also, an accretion of the blue ice could fly rearwardly and become ingested into the aircraft engine 12 with hazardous consequences. The present invention is directed to a system and method intended to minimize the opportunity for leakage of toilet waste down the drain tube 7.

In more detail, the holding tank 4 (FIG. 3) is a generally rectangular structure having vertically spaced lower and upper walls 14 and 16, respectively. The outlet tube 6 is attached to, and extends through the lower wall 14, in communication with the interior of the tank. The drain tube 7, which may be a plastic or rubber-like material, is secured to the exterior of the outlet tube by a circular clip and extends down to the access port. At the juncture between the lower wall 14 and the opening of the outlet tube 6, there is a shoulder 18 of changing diameter which is rounded or chamfered to assist in guiding a cylindrical valve 20 into the outlet tube. In some prior art aircraft waste systems, it has been known to use a closure valve of larger diameter than the outlet tube which seated on the rounded or chamfered transition shoulder. Unfortunately, however, the transition shoulder can become damaged over an extended period of use due to hard or sharp foreign objects which are flushed into the tank such as hairpins or other bottle caps which cause the transition region to become scored or dented, developing surface blemishes which provide channels for leakage of liquid waste past the valve.

The system of the present invention avoids the problems associated with seating on a blemished transition shoulder. Instead, the valve 20 is inserted a sufficient, predetermined distance into the outlet tube to carry it past the transition region into a constant diameter region of the outlet tube. Sealing between the valve 20 and the constant diameter interior cylindrical surface of the outlet tube 6 is effected by a compressible O-ring 22 mounted in an O-ring groove 24 extending around the bottom of the valve 20. As the compressible O-ring 22 enters the outlet tube, it is guided into it and compressed as it passes through the shoulder 18. During this passage, the valve 20 wipes any obstructions that have become lodged in the transition area down into the outlet tube ahead of the compressible O-ring 22. Thus, as the compressed O-ring 22 reaches the predetermined distance within the outlet tube, it seats upon an unblemished interior region of the outlet tube which is of constant diameter. This provides a liquid-tight seal that will not allow toilet waste to leak through the outlet tube into the drain tube 7 during flight.

It is important for safety reasons to provide assurance before flight begins that the valve 20 has moved to at least the predetermined depth within the outlet tube. For this purpose, the waste system of the present invention includes a monitoring system (described later) connected via electrical circuitry 30 to a warning device 32 on the aircraft. Also, the monitoring system causes motion of the valve to be stopped at the predetermined position. In the preferred embodiment, the warning device 32 is a warning light. The warning device is mounted on an aircraft servicing panel 33 recessed into the aircraft fuselage, near the outlet to which it relates. Typically the service panel includes an in-flight cover (not shown) which may be moved aside to gain access to the panel for ground servicing. The servicing panel 33 carried OPEN and CLOSE switches, or press buttons, which direct d.c. electric current in the appropriate directions, as selected, to open or close the valve. Additional alarms may be mounted in the aircraft cockpit and, also, in the pursers pantry of a commercial airliner within eyesight of cabin personnel. In an ALARM condition, the light 32 is illuminated to advise the watcher that the valve for the toilet waste tank has not yet penetrated the outlet tube deeply enough to reach its predetermined, fully closed position. When the valve reaches the predetermined position, the monitoring system causes the warning device 32 to change to a non-alarm condition. In the case of the warning light used in the preferred embodiment, the light goes out. This arrangement provides an alert to put off the flight until additional ground servicing can be performed to achieve proper seating of the discharge valve. As a result, the opportunity for in-flight leakage of toilet wastes is effectively prevented and the hazards of accretion of blue ice are eliminated.

Guidance of the valve 20 along a predetermined path from the tank interior into the outlet tube 6 is achieved by telescoping inner and outer tubes 36 and 38 secured at their outer ends to the upper wall 16 of the tank and to the valve 20, respectively (FIG. 3). The outer tube 38 is provided, at its lower end, with a generally rectangular cross-section inner tube 36 for vertical sliding motion along an axis aligned with the axis of the outlet tube 6. At its lower end, the inner tube 36 is connected to the valve 20 by conventional connecting structure generally designated 42. A flexible corrugated sleeve 44 encloses the inner tube 36, extending between the outer tube and the valve, to protect the exterior surface of the inner tube from contact with the waste in the tank. Waste contact could cause the surface of the inner tube to become corroded or to build up deposits thereon, either of which would cause it to slide less smoothly in the bore of the connector 40.

Axial driving motion is imparted to the inner tube 36 by a threaded drive shaft 46 mounted at its upper end to a conventional coupling 47 extending through the upper wall 16. The drive shaft 46 is threadedly engaged by a travelling nut 48 fixedly mounted in the upper end of the inner tube 36. Selective rotation of the drive shaft 46 in opposite directions extends and retracts the inner tube 36 relative to the outer tube 38, thereby controlling movement of the valve 20 into and out of the outlet tube. Driving rotation of the drive shaft 46 is effected by a conventional reversible electric motor 50 (FIG. 2) connected through a conventional geared drive train 51 and the coupling 47 to the drive shaft 46. By selectively directing power to a d.c. power source (not shown) to the reversible motor in the appropriate polarity through conventional electrical switching circuitry controlled by the OPEN-OFF-CLOSE switches on the switching panel 33, the ground operator servicing the aircraft can selectively control the opening and closing of the discharge valve.

The previously mentioned function of monitoring the depth to which the valve 20 has entered the outlet tube is performed by use of a monitoring assembly shown in FIG. 2. For convenience, the monitoring assembly, the drive motor 50 and the bearing assembly 47 are all contained within a common housing unit secured to the outside of the upper wall 16 of the holding tank (FIG. 3). The monitoring assembly includes a monitoring shaft 52 (FIG. 2) which is connected to the drive train 51 for rotation at the same rotational speed as the drive shaft 46, extending upwardly and concentrically from it. The monitoring shaft 52 supports an actuator arm 54 which threadedly engages the monitoring shaft and extends outwardly through a slot in a stationary retaining housing (not shown) which prevents the actuator arm from rotating but permits up and down translational movement. Rotation of the monitoring shaft causes upward or downward translation of the actuator arm 54 dependent upon the direction of rotation.

The free end of the actuator 54 impinges upon conventional, upper and lower microswitches 60 and 62. Each of the microswitches is spring-biased to a normally closed condition until it is impinged upon by the actuator arm 54 which causes it to switch to its open condition.

The upper and lower microswitches are connected into the electrical circuitry connecting the d.c. power source, the switches on the servicing panel 33, and the warning light 32. The circuitry includes conventional switches for selectively directing electric current in opposite polarities, as selected by the person operating the switch, to the electric motor 50 to move the valve 20 to either enter the tank or to enter the outlet tube. The upper microswitch 60, which is normally spring biased to its closed condition, is impinged upon by the actuator 54 of the monitoring assembly during upward movement of the valve to break the electrical circuit to the motor and terminate further upward motion of the valve beyond a fully open position. When the switching circuitry is operated to advance the valve 20 downwardly into the outlet tube, the actuator 54 impinges upon the normally closed lower microswitch 62 to move it to its open condition breaking the electrical circuit to the electric motor 50 and halting movement of the valve in its fully closed condition at the predetermined depth below the opening of the outlet tube into the tank.

The lower microswitch 62 also includes a second set of contacts which are biased to a normally closed condition to deliver electric current to the warning device 32 to maintain it in the alarm condition, specifically to illuminate the warning light on the service panel and at any additional alarm locations such as the aircraft cockpit and the pursers pantry. However, impingement of the actuator arm on the lower microswitch opens the second set of contacts and removes power from the warning device 32 to cause it to revert to a non-alarm condition in which the light goes out.

To reduce the overall dimensions of the monitoring assembly, because space and weight are at a premium in an aircraft, it is desirable to reduce the length and bulk of the monitoring shaft compared to the drive shaft. Accordingly, in the preferred embodiment, the thread of the monitoring shaft has a much finer pitch than the thread of the drive shaft. Thus, for the same number of revolutions of both, the actuator arm 54 travels linearly through only a fraction of the distance travelled by the valve. In the preferred embodiment, a four to one ratio is achieved between the pitches of the monitoring shaft and the drive shaft, thereby enabling the spacing between the upper and lower microswitches to be only one-quarter of the length that exists between the fully open and fully closed positions of the valve 20. As a result, the metering shaft can be reduced to comparable dimensions to the vertical height of the motor 50, enabling the monitoring assembly to be housed conveniently within the same housing structure as the drive motor.

The drain plug driving mechanism comprising the telescoping tube structure 38 and 46, the motor structure 50, shaft drives 51 metering shaft 52 with associated actuator 54 and microswitches 60 and 62 corresponds to a drive mechanism already in use and sold by applicant's assignee, and designed by another of its employees, since about August, 1992 to Boeing Airplane Co. The system with which this driving mechanism has been sold to Boeing, however, uses a conventional overlapping type of drain valve plug, of the type described earlier, in which the plug is larger than the diameter of the outlet tube and seats on its open mouth resting against the sloped entry shoulder. Thus, the system sold to Boeing has the difficulties of the overlapping type drain valves of the prior art noted earlier in the Background of the application.

It will be appreciated that the monitoring assembly and warning light are of great value because a clear warning alarm is provided before flight if the valve has failed to reach the predetermined position within the outlet tube associated with an effective seal against leakage. If the warning light remains on, the necessary ground servicing can be undertaken to rectify the condition before flight commences. Accordingly, this arrangement minimizes the risk that the aircraft will take off with the valve in an inadequately sealing condition which could permit leakage of waste during flight and create the dangers associated with blue ice accretions.

Although the invention has been principally described thus far with reference to its apparatus aspects, the invention embraces a sequence of steps constituting a novel method intended to achieve the described results. Specifically, the method comprises the steps of driving the valve along its predetermined path between the interior of the tank and the inside of the outlet tubes; providing sealing surfaces circumferentially around the valve to seal against the interior surfaces of the outlet tube; monitoring the depth of insertion of the valve into the outlet tube; providing a warning system in the aircraft which has alarm and non-alarm conditions; and activating the warning system to its alarm condition until the valve has been moved to the predetermined depth into the outlet tube and thereupon changing the condition of the warning system to its non-alarm condition.

While the invention has been described with reference to its preferred embodiment, it will be appreciated by those skilled in this art that variations may be made departing from the precise structure or method disclosed herein which, nonetheless, embody the invention defined by the appended claims.

I claim:

1. A method of preventing leakage of liquid waste from an aircraft holding tank of the type provided with an outlet tube connected to a lower wall of the holding tank, the outlet tube having a constant diameter portion and a rounded entry shoulder between the constant diameter portion and the lower wall, and further provided with a valve insertable into the outlet tube in sealing relation for closure thereof, the method intended to minimize the risk of waste leakage during flight by providing an alarm warning in the aircraft cockpit if the valve has not achieved a predetermined depth of insertion into the outlet tube sufficient to ensure sealing against leakage of waste past the valve, the method comprising the steps of, driving the valve along a predetermined path between the interior of the tank and the inside of the constant diameter portion of the outlet tube;

providing sealing surfaces circumferentially around the valve to seal against the interior surfaces of the constant diameter portion of the outlet tube;

monitoring the depth of insertion of the valve into the outlet tube, such that the valve is inserted to a region below the entry shoulder and at an interior region of the constant diameter portion of the outlet tube;

providing a warning system in the aircraft which has alarm and non-alarm conditions; and, activating the warning system to its alarm condition until the valve has been monitored to have been moved the predetermined depth into the outlet tube and thereupon changing the condition of the warning system to its non-alarm condition.

2. An aircraft waste holding system for holding liquid wastes during flight, having a selectively openable and closeable discharge outlet for discharging the waste during ground servicing, the system comprising, a holding tank for storing the liquid waste;

an outlet tube connected to a lower wall of said holding tank communicating with the interior thereof, said outlet tube having a constant diameter portion and a rounded entry shoulder between said constant diameter portion and said lower wall, said outlet tube constituting the discharge outlet;

a valve shaped to enter said outlet tube and seal circumferentially against the interior of said constant diameter portion thereof;

guide means connected to said tank for guiding said valve along a predetermined path from the interior of said tank into the interior of said outlet tube;

driving means connected to said valve and said tank for selectively driving said valve back and forth along said predetermined path;

monitoring means connected with said driving means responsive to the position of said valve for signalling when said valve has been inserted to a predetermined depth within said outlet tube, said predetermined depth being below said rounded entry shoulder and being at an interior region of said constant diameter portion of said outlet tube; and, control means connected to said driving means for controlling the driving of said valve between the interior of said tank and the interior of said outlet tube.

3. An aircraft waste holding system as defined in claim 1 further including, warning means mounted in the aircraft operatively connected with said driving means for providing an alarm warning which is continuously activated until said valve has reached at least a predetermined depth within said outlet tube at which point said warning means deactivates the alarm warning.

4. An aircraft waste holding system as defined in claim 1 further including, limit means connected with said driving means for automatically terminating penetration of said valve into said outlet tube at a predetermined depth therein.

5. An aircraft waste holding system for holding liquid wastes during flight, having a selectively openable and closeable discharge outlet for discharging the waste during ground servicing, intended to minimize the risk of waste leakage during flight by providing a warning concerning closure of the discharge outlet, the system comprising, a holding tank for storing the liquid waste;

an outlet tube connected to a lower wall of said holding tank communicating with the interior thereof, said outlet tube having a constant diameter portion and a rounded entry shoulder between said constant diameter portion and said lower wall, said outlet tube constituting the discharge outlet;

a valve shaped to enter said outlet tube and seal circumferentially against the interior of said constant diameter portion;

guide means connected to said tank for guiding said valve along a predetermined path from the interior of said tank into the interior of said outlet tube;

driving means connected to said valve and said tank for selectively driving said valve back and forth along said predetermined path;

monitoring means connected with said driving means responsive to the position of said valve for signalling when said valve has been inserted to a predetermined depth within said outlet tube, said predetermined depth being below said rounded entry shoulder and being at an interior region of said constant diameter portion of said outlet tube; and, warning means in the aircraft operatively connected with said monitoring means for providing an alarm warning until said valve has been inserted at least the predetermined depth into said outlet tube sufficient to ensure sealing against leakage of waste past said valve.

6. An aircraft waste holding system as defined in claim 5 wherein, said guide means includes, outer and inner telescoping tubes connected to an upper wall of said tank and to said valve, respectively, in alignment with said outlet tube, relative telescoping motion of said second tube outwardly from said first tube guiding said valve into said outlet tube, and wherein said driving means includes, a reversible electric motor connected to the upper wall of said tank;

a threaded drive shaft connected to said drive motor for selective rotation thereby in opposite directions, said drive shaft extending concentrically within said telescoping tubes;

a nut threadedly engaging said drive shaft and fixedly to an upper end of said first and second tubes thereby causing relative telescoping movement of said inner one of the tubes to drive said valve.

7. An aircraft waste holding system as defined in claim 6 wherein, said monitoring means includes, a threaded monitoring shaft rotated by said electric motor concurrently with said drive shaft;

an actuator threadedly engaging said monitoring shaft for movement therealong proportionate to the movement of said valve;

a switch mounted adjacent to said monitoring shaft at a fixed axial location therealong corresponding to the position which said actuator occupies when said valve is at said predetermined depth in said outlet tube, said switch being switched by said actuator from one condition when said valve is less than said predetermined depth into said outlet tube to an opposite condition as said valve reaches said predetermined depth, and wherein said warning means includes, an electrically operated alarm unit having an alarm condition and a non-alarm condition, an electrical circuit connecting said alarm unit to said switch, said circuit placing said alarm unit in the alarm condition when said switch is in its one condition and in its non-alarm condition when said switch is in its opposite condition.

8. An aircraft waste holding system as defined in claim 7 wherein the axial range of movement of said actuator along said monitoring shaft is less than the axial range of movement of said valve but is scaled proportionately thereto.

9. An aircraft waste holding system for holding liquid wastes during flight, having a selectively openable and closeable discharge outlet for discharging the waste during ground servicing, intended to minimize the risk of waste leakage during flight, the system comprising, a holding tank for storing the liquid waste;

an outlet tube connected to a lower wall of said holding tank communicating with the interior thereof, said outlet tube having a constant diameter portion and a rounded entry shoulder between said constant diameter portion and said lower wall, said outlet tube constituting the discharge outlet;

a valve shaped to enter said outlet tube and seal circumferentially against the interior of said constant diameter portion; guide means connected to said tank for guiding said valve along a predetermined path from the interior of said tank into the interior of said outlet tube;

driving means connected to said valve and said tank for selectively driving said valve back and forth along said predetermined path;

monitoring means connected with said driving means responsive to the position of said valve for signalling said valve has been inserted to a predetermined depth within said outlet tube, said predetermined depth being below said rounded entry shoulder and being at an interior region of said constant diameter portion of said outlet tube; and, open and closed limit means connected with said monitoring means for automatically terminating movement of said valve into said tank beyond a fully open, predetermined position and into said outlet tube beyond said predetermined depth corresponding to a fully closed condition.

* * * * *